(12) United States Patent
Leverett

(10) Patent No.: US 10,806,263 B1
(45) Date of Patent: Oct. 20, 2020

(54) CUSHION

(71) Applicant: MERITS HEALTH PRODUCTS CO., LTD., Taichung (TW)

(72) Inventor: David Leverett, Ringgold, GA (US)

(73) Assignee: MERITS HEALTH PRODUCTS CO., LTD., Taichung (TW)

( * ) Notice: Subject to any disclaimer, the term of this patent is extended or adjusted under 35 U.S.C. 154(b) by 0 days.

(21) Appl. No.: 16/362,985

(22) Filed: Mar. 25, 2019

(51) Int. Cl.
| | |
|---|---|
| *A47C 7/18* | (2006.01) |
| *A47C 3/00* | (2006.01) |
| *A47C 31/12* | (2006.01) |
| *A61G 5/10* | (2006.01) |
| *B60N 2/60* | (2006.01) |
| *A47C 7/02* | (2006.01) |
| *B60N 2/70* | (2006.01) |

(52) U.S. Cl.
CPC .................. *A47C 7/18* (2013.01); *A47C 3/00* (2013.01); *A47C 31/126* (2013.01); *A47C 7/021* (2013.01); *A47C 7/0213* (2018.08); *A61G 5/1043* (2013.01); *A61G 5/1045* (2016.11); *B60N 2/60* (2013.01); *B60N 2/7005* (2013.01)

(58) Field of Classification Search
CPC ......... A47C 7/18; A47C 7/021; A47C 7/0213; A61G 5/1043; A61G 5/1045; B60N 2/60; B60N 2/7005
USPC .......................................... 297/452.59, 218.2
See application file for complete search history.

(56) References Cited

U.S. PATENT DOCUMENTS

| | | | |
|---|---|---|---|
| 6,588,840 B1 * | 7/2003 | Lombardo | A47C 1/16 297/188.08 |
| 10,064,492 B2 * | 9/2018 | Lobel | A47C 7/021 |
| 2005/0264057 A1 * | 12/2005 | Huse | A47C 31/11 297/228.11 |
| 2010/0026077 A1 * | 2/2010 | Tarumi | B60N 2/643 297/452.62 |
| 2013/0257132 A1 * | 10/2013 | Chen | A47C 7/021 297/452.21 |

* cited by examiner

*Primary Examiner* — Syed A Islam
(74) *Attorney, Agent, or Firm* — Muncy, Geissler, Olds & Lowe, P.C.

(57) ABSTRACT

Provided is a cushion including a pad, an envelope, and a support pad set. The pad has a sunken portion. The envelope is disposed on the pad. The envelope has a pocket-shaped body. A plurality of coupling portions is disposed at edges of the body. The support pad set includes an upper foam pad, a lower foam pad, and a soft gel pad. The support pad set is disposed in the body of the envelope.

6 Claims, 4 Drawing Sheets

CUSHION

BACKGROUND OF THE INVENTION

1. Technical Field

The present disclosure relates to buttock supporting equipment and, more particularly, to a cushion with multiple levels of softness.

A cushion is a soft thing which a user sits on comfortably as it supports the user's buttocks sufficiently. However, the cushion does not give sufficient support to the buttocks of users who lead a sedentary lifestyle or have paralyzed lower limbs, and in consequence hipbones are under prolonged pressure to the detriment of blood circulations, leading to bedsores. Therefore, it is imperative to provide a solution.

BRIEF SUMMARY OF THE INVENTION

It is an objective of the present disclosure to provide a cushion structured to give multiple degrees of support.

In order to achieve the above and other objectives, the present disclosure provides a cushion comprising a pad, an envelope, and a support pad set. The pad has a sunken portion. The envelope is disposed on the pad. The envelope has a pocket-shaped body. A plurality of coupling portions is disposed at edges of the body. The support pad set includes an upper foam pad, a lower foam pad, and a soft gel pad. The support pad set is disposed in the body of the envelope.

DETAILED DESCRIPTION OF THE INVENTION

Figure 1:
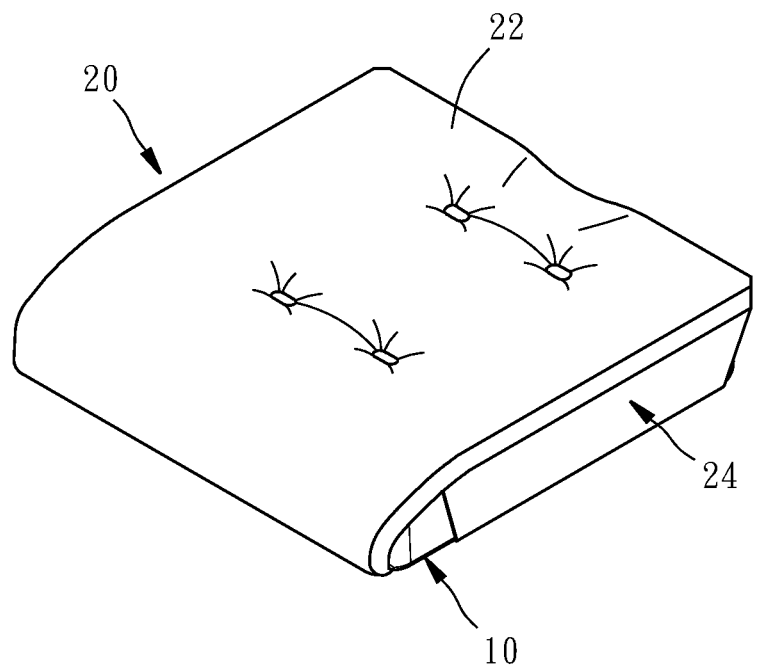
FIG. 1 is a perspective view of a cushion of the present disclosure.
Figure 2:
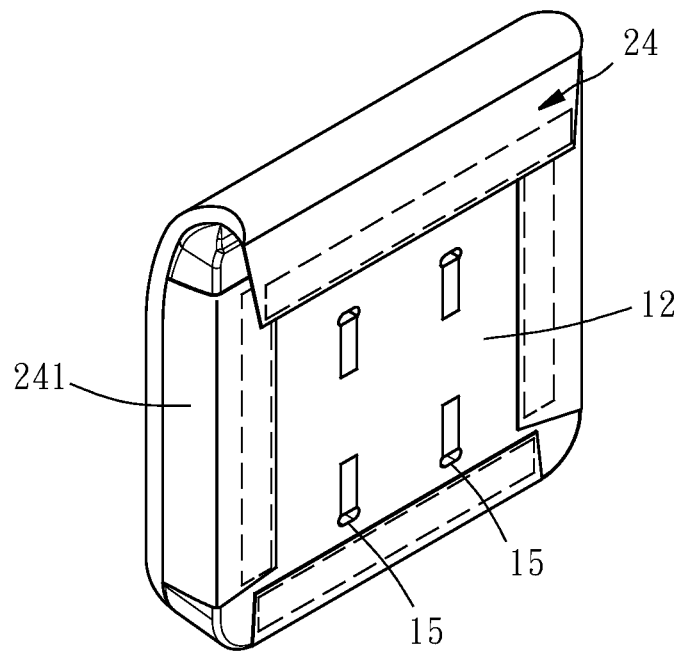
FIG. 2 is a perspective view of the cushion from another angle according to the present disclosure.
Figure 3:
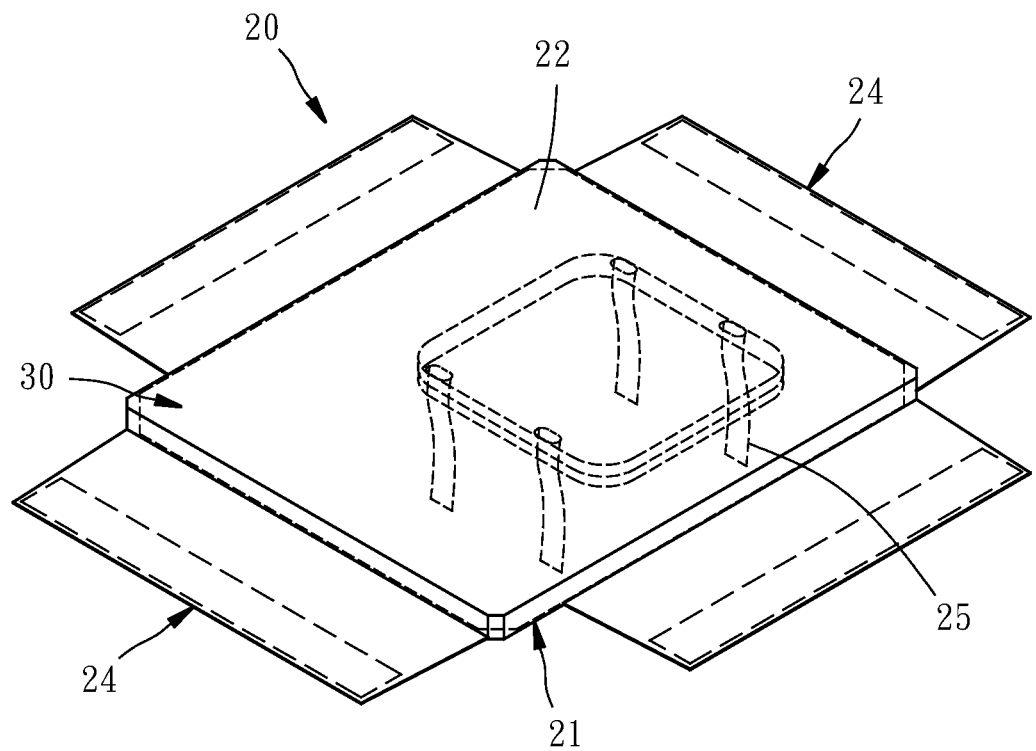
FIG. 3 is an exploded view of the cushion of the present disclosure.
Figure 3:
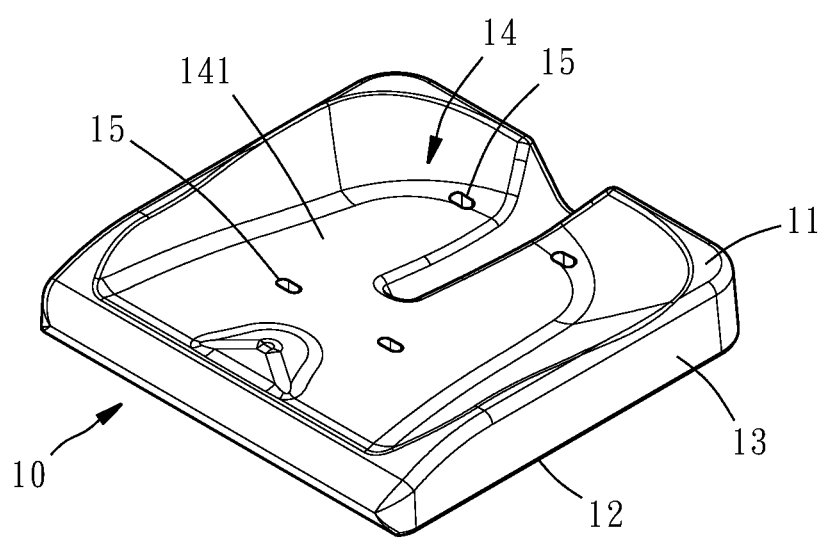
Figure 4:
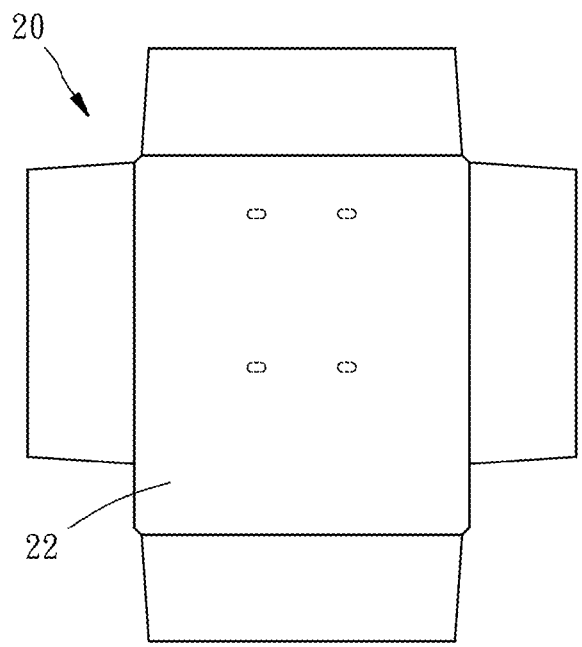
FIG. 4 is a front view of an envelope of the cushion of the present disclosure.
Figure 5:
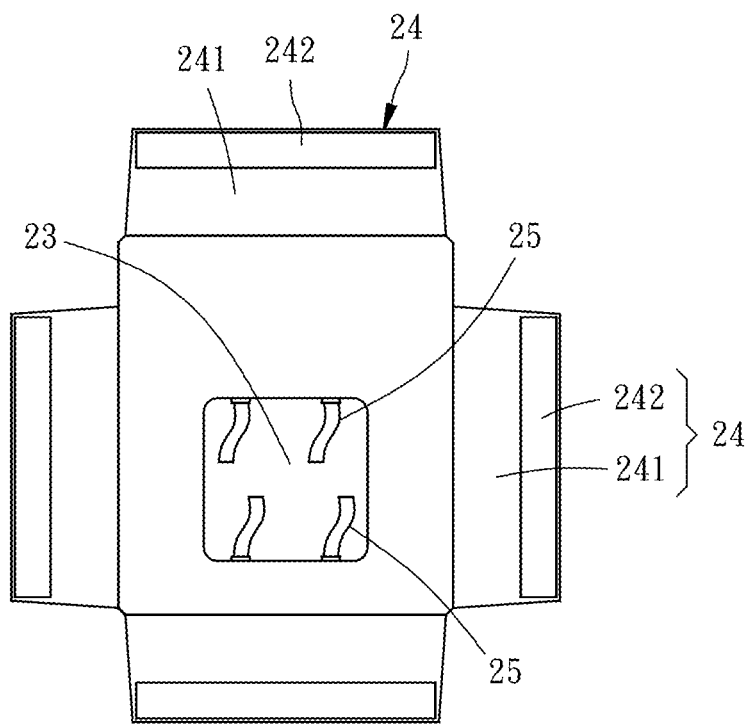
FIG. 5 is a rear view of the envelope of the cushion of the present disclosure.
Figure 6:
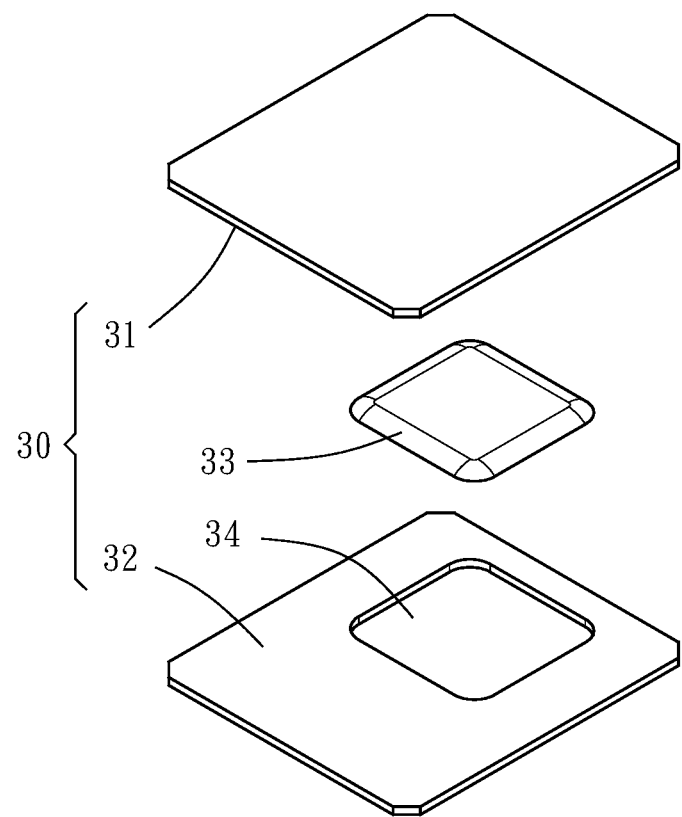
FIG. 6 is an exploded view of a support pad set of the cushion of the present disclosure.

Referring to FIG. 1 through FIG. 6, a cushion of the present disclosure comprises a pad 10, an envelope 20, and a support pad set 30.

The pad 10 is integrally made of foam and has a top side 11, a bottom side 12, and a lateral side 13 disposed between the top side 11 and the bottom side 12 and surrounding the pad 10. The pad 10 sinks in the direction pointing from the top side 11 to the bottom side 12 to form a sunken portion 14. The sunken portion 14 has a bottom portion 141 such that a height difference is formed between the bottom portion 141 of the sunken portion 14 and the top side 11 of the pad 10. The upper edge of the sunken portion 14 sinks and tapers in the direction pointing from the top side 11 of the pad 10 to the bottom side 12 of the pad 10; hence, the upper edge of the sunken portion 14 is wider than the bottom portion 141 of the sunken portion 14. A plurality of through holes 15 is disposed on the bottom portion 141 of the sunken portion 14 and penetrates from the bottom portion 141 of the sunken portion 14 to the bottom side 12 of the pad 10. In this embodiment, the pad 10 is made of high-density (3.5 $Lb/ft^3$~5 $Lb/ft^3$) foam polyurethane. The bottom portion 141 of the sunken portion 14 has four through holes 15. The pad 10 is of such a shape that it is ergonomic for a sitting person and conducive to good posture and optimal pressure distribution.

The envelope 20 has a pocket-shaped body 21. The body 21 has an outer lateral side 22 and an inner lateral side 23. A plurality of coupling portions 24 is disposed at the edges of the body 21. In this embodiment, the body 21 is a rectangular cuboid, and a coupling portion 24 is disposed at each of its four edges. The coupling portions 24 each comprise a fabric 241 and a Velcro hook-and-loop fastener strap 242. The fabric 241 is connected to the body 21, whereas the Velcro hook-and-loop fastener strap 242 is disposed on the fabric 241, but the present disclosure is not limited thereto. In a variant embodiment, the coupling portions each include a fabric and a button, include a fabric and a zipper, or include a velcro Velcro hook-and-loop fastener strap. A plurality of coupling bands 25 is disposed on the inner lateral side 23 of the body 21. The coupling bands 25 are each provided with a fastening portion and are paired. The fastening portions are fastened to each other or to the bottom side 12 of the pad 10. The envelope 20 corresponds in shape to the pad 10 substantially and is disposed on the top side 11 of the pad 10. The inner lateral side 23 of the envelope 20 faces the top side 11 of the pad 10. The coupling portions 24 bend downward to therefore cover the lateral side 13 of the pad 10, then extend to therefore cover the bottom side 12 of the pad 10, and finally the Velcro hook-and-loop fastener straps 242 of the coupling portions are coupled to the bottom side 12 of the pad 10. The coupling bands 25 penetrate the through holes 15 of the sunken portion 14 of the pad 10, respectively, and then are paired before being coupled together or fastened to the bottom side 12 of the pad 10 by the fastening portions.

The support pad set 30 comprises an upper foam pad 31, a lower foam pad 32, and a soft gel pad 33. The upper foam pad 31 and the lower foam pad 32 correspond in shape to the pad 10 substantially. The lower foam pad 32 has a receiving hole 34. The soft gel pad 33 is disposed in the receiving hole 34. The support pad set 30 is disposed in the body 21 of the envelope 20. The upper foam pad 31 is made of gel infused viscoelastic foam polyurethane (4 $Lb/ft^3$~6 $Lb/ft$). The upper foam pad 31 provides comfort and promotes blood circulation. The soft gel pad 33 is made of high-viscosity silica gel to not only relieve the pressure otherwise imposed on ischium and coccyx but also prevent shear force. The two advantages are conducive to prevention of bedsores. The lower foam pad 32 is made of high-density, high-elasticity foam polyurethane (54 Lb IFD~58 Lb IFD) and covers the edges of the soft gel pad 33 to exert an upward, supportive force on the greater trochanter of femur from below and thus sink further into the soft gel pad 33 so as to reduce the pressure otherwise imposed on ischial tuberosity and coccyx. The IFD means Indentation Force Deflection. The soft gel pad 33 of the support pad set 30 is a good pressure-relieving zone for eliminating the pressure otherwise imposed on the coccyx and sacrum to provide comfort and prevent bedsores.

The cushion of the present disclosure is advantageous in that the envelope can be coupled to or separated from the pad easily and quickly so as to be changed or cleaned by users easily.

The pad operates in conjunction with the support pad set which has multiple levels of softness. While a user is sitting on the pad, the pad gives different degrees of support to different parts of the user's buttocks, for example, supporting the ischium with the soft gel pad of the support pad set.

Depending on the material or softness of the support pad set disposed in the envelope, the user can vary or adjust the cushion's degree of softness and supportive strength as needed, thereby the user's need for customization. Furthermore, both the pad and the support pad set can be independently changed to enable different combinations.

What is claimed is:

1. A cushion, comprising:
    a pad having a top side, a bottom side, and a lateral side disposed between the top side and the bottom side, the pad sinking in a direction pointing from the top side to the bottom side to form a sunken portion, the sunken portion having a bottom portion with a plurality of through holes penetrating from the bottom portion of the sunken portion to the bottom side of the pad;
    an envelope having a pocket-shaped body with an outer lateral side and an inner lateral side, the envelope covering the top side of the pad, wherein a plurality of coupling portions are disposed at edges of the body and bend downward to therefore cover the pad, wherein a plurality of coupling bands is disposed on the inner lateral side of the body and penetrate the through holes of the pad, respectively; and
    a support pad set comprising an upper foam pad, a lower foam pad, and a soft gel pad and disposed in the body of the envelope;
        wherein the lower foam pad has a receiving hole, and the soft gel pad is disposed in the receiving hole;
        wherein the coupling bands are each provided with a fastening portion, and the fastening portions are fastened to each other or to the bottom side of the pad;
        wherein the plurality of through holes of the pad are arranged in a pair-by-pair manner;
    wherein the plurality of coupling bands are arranged in a pair-by-pair manner and penetrated through between the lower foam pad and the soft gel pad.

2. The cushion of claim 1, wherein the coupling portions bend downward to therefore cover the lateral side of the pad and extend to the bottom side of the pad.

3. The cushion of claim 2, wherein the coupling portions each comprise a fabric and a strap, the fabric being connected to the body, and the strap being disposed on the fabric.

4. The cushion of claim 3, wherein the straps of the coupling portions are coupled to the bottom side of the pad.

5. The cushion of claim 1, wherein the filling pad differs from the pad in material and softness.

6. The cushion of claim 3, wherein the filling pad differs from the pad in material and softness.

* * * * *